(12) United States Patent
Ishikawa et al.

(10) Patent No.: US 11,728,503 B2
(45) Date of Patent: Aug. 15, 2023

(54) FUEL CELL MODULE

(71) Applicant: TOYOTA JIDOSHA KABUSHIKI KAISHA, Toyota (JP)

(72) Inventors: Daisuke Ishikawa, Aichi-gun (JP); Hiroaki Nishiumi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 167 days.

(21) Appl. No.: 17/451,074

(22) Filed: Oct. 15, 2021

(65) Prior Publication Data

US 2022/0173424 A1    Jun. 2, 2022

(30) Foreign Application Priority Data

Nov. 30, 2020 (JP) ................. 2020-198190

(51) Int. Cl.
*H01M 8/2475* (2016.01)
*H01M 8/04082* (2016.01)
*H01M 8/04029* (2016.01)

(52) U.S. Cl.
CPC ..... *H01M 8/2475* (2013.01); *H01M 8/04029* (2013.01); *H01M 8/04201* (2013.01)

(58) Field of Classification Search
None
See application file for complete search history.

(56) References Cited

U.S. PATENT DOCUMENTS

2011/0143238 A1* 6/2011 Ogawa ............... H01M 8/2465
429/441
2020/0119387 A1* 4/2020 Yanagiuchi ......... H01M 8/2475

FOREIGN PATENT DOCUMENTS

JP         2013004352 A    1/2013

* cited by examiner

*Primary Examiner* — Christopher P Domone
(74) *Attorney, Agent, or Firm* — Hunton Andrews Kurth LLP

(57) ABSTRACT

A fuel cell module includes a fuel cell stack, a plurality of accessories, a plurality of maintenance components, and a frame. The frame has a three-dimensional structure having an internal space. The fuel cell stack and the accessories are fixed to the frame in a state where they are accommodated in the internal space. In a plan view of the fuel cell module, the maintenance components are fixed to the frame in a state where the maintenance components are placed in an external space formed on one side from the frame from among external spaces formed outside the internal space.

6 Claims, 4 Drawing Sheets

FUEL CELL MODULE

CROSS-REFERENCE TO RELATED APPLICATION

This application claims priority to Japanese Patent Application No. 2020-198190 filed on Nov. 30, 2020, incorporated herein by reference in its entirety.

BACKGROUND

1. Technical Field

The present disclosure relates to a fuel cell module.

2. Description of Related Art

In the related art, as a fuel cell module of this type, Japanese Unexamined Patent Application Publication No. 2013-4352 (JP 2013-4352 A) proposes a fuel cell module including a fuel cell stack and a plurality of accessories configured to drive the fuel cell stack. The fuel cell stack of the fuel cell module is accommodated in a stack case. The accessories are accommodated in an accessory cover in a state where the accessories are attached to an end plate, and the accessory cover is attached to the stack case.

SUMMARY

However, the fuel cell module described in JP 2013-4352 A also includes a plurality of maintenance components connected to the fuel cell stack and the accessories and subjected to inspection or maintenance at the time of use. The arrangement state of these components is not considered. Accordingly, such a case is assumed that, after the fuel cell module is attached, the inspection or the maintenance of the maintenance components cannot be performed smoothly.

In consideration of such a point, the present disclosure provides a fuel cell module in which inspection or maintenance can be smoothly performed on a plurality of maintenance components.

In order to solve the above problem, a fuel cell module according to the present disclosure is a fuel cell module including a fuel cell stack, a plurality of accessories, a plurality of maintenance components, and a frame. The accessories are configured to drive the fuel cell stack. The maintenance components are connected to the fuel cell stack or any of the accessories and to be subjected to inspection or maintenance. The frame is configured to support the fuel cell stack, the accessories, and the maintenance components. The frame has a three-dimensional structure having an internal space surrounded by beams and pillars. The fuel cell stack and the accessories are fixed to the frame in a state where the fuel cell stack and the accessories are accommodated in the internal space. In a plan view of the fuel cell module, the maintenance components are fixed to the frame in a state where the maintenance components are placed in an external space formed on one side from the frame among external spaces formed outside the internal space.

In the present disclosure, the maintenance components that require inspection or maintenance are fixed to the frame in a state where they are placed in the external space formed on the one side from the frame among the external spaces formed outside the internal space of the frame. Accordingly, when a space that enables operations is provided near the external space formed on the one side from the frame at the time when the fuel cell module is attached to a vehicle or the like, it is possible to smoothly perform inspection or maintenance on the maintenance components.

Note that the "maintenance components" as used herein indicate components to be subjected to maintenance by a regular inspection such as a mandatory inspection, a daily inspection by a user, or the like after the fuel cell stack is used. The maintenance components may include the accessories configured to drive the fuel cell stack. Further, the maintenance as used herein indicates repair (cleaning) or replacement of the maintenance components themselves or refilling of liquid or the like.

Here, the maintenance components are not limited in particular, provided that the maintenance components are components to be subjected to inspection or maintenance. The following aspect may be employed, for example. As a specific aspect, the maintenance components may include at least two or more of the following: a first heat exchanger configured to cool a first coolant discharged from the fuel cell stack; a first tank in which a refill for the first coolant is stored; a second heat exchanger configured to cool a second coolant discharged from some of the accessories; a second tank in which a refill for the second coolant is stored; an ion exchanger configured to capture ions included in the first coolant circulating between the first heat exchanger and the fuel cell stack; an air cleaner placed on an upstream side from a compressor configure to supply air to the fuel cell stack, from among the accessories; and a relay box electrically connected to the fuel cell stack or some of the accessories.

The maintenance components described herein are components on which inspection or maintenance is performed regularly. Since cooling performance of the first and second heat exchangers decreases due to continuous use, the first and second heat exchangers are subjected to inspection or cleaning or replaced as needed. In order to secure storage amounts of the first and second coolants in the first and second tanks, the first and second tanks are inspected regularly, and the first and second tanks are refilled with the first and second coolants, respectively. When ion exchange performance of the ion exchanger decreases, the ion exchanger is repaired or replaced regularly. Contamination capturing performance (a clean-up rate) of the air cleaner to capture contaminations contained in air may decrease, and therefore, a filter or the like of the air cleaner is cleaned up or replaced regularly. The relay box is a relay box electrically connected to the fuel cell stack or some of the accessories, and the relay box is inspected regularly.

As such, the maintenance components are frequently subjected to inspection or maintenance. Accordingly, by placing the maintenance components in the external space formed on the one side from the frame, the maintenance components can be inspected smoothly or working efficiency of the maintenance can be raised.

If the maintenance components can be fixed to the frame in a state where they are placed in the external space formed on the one side from the frame, the following aspect may be employed, for example. As a specific aspect, the maintenance components may include the first tank or the second tank. In a plan view of the fuel cell module, the frame may have a rectangular outer shape. The first tank or the second tank may be placed closer to a corner of the frame.

With this aspect, in a plan view of the fuel cell module, by placing the first or second tank in an external space closer to the corner side of the frame, it is possible to easily check the storage amount of the first or second coolant. Particularly, when a light transmissive material such as a transparent material is used for the first or second tank, it is possible to more smoothly inspect the storage amount.

As a further specific aspect, the maintenance components may include at least either one of a first set and a second set, the first set being constituted by the first tank and the first heat exchanger, the second set being constituted by the second tank and the second heat exchanger. The first tank may be placed above the first heat exchanger, or the second tank is placed above the second heat exchanger.

In this aspect, in a case where the maintenance components include the first set, the first tank is placed above the first heat exchanger, and therefore, air accumulated in the first heat exchanger and a cooling passage can be easily removed from a liquid refilling port of the first tank. Similarly, in a case where the maintenance components include the second set, the second tank is placed above the second heat exchanger, and therefore, air accumulated in the second heat exchanger and a cooling passage can be easily removed from a liquid refilling port of the second tank. Further, the first and second tanks are easily refilled with the first and second coolants, respectively.

As a further specific aspect, the maintenance components may include the ion exchanger and the relay box. The ion exchanger and the relay box may be provided in the external space such that the ion exchanger and the relay box are arranged side by side in a direction distanced from the internal space. The relay box may be placed at a position more distanced from the internal space than the ion exchanger.

In this aspect, the relay box that is more frequently inspected than the ion exchanger is placed at a position more distanced from the internal space of the frame than the ion exchanger. Accordingly, it is possible to more smoothly perform inspection on the relay box.

As a further specific aspect, a shelf member may be attached to the frame in the external space formed on the one side. The maintenance components may be arranged in the up-down direction across the shelf member.

In this aspect, by placing the maintenance components above and below the shelf member, the maintenance components can be put together efficiently in a small space, thereby making it possible to increase stability in the posture of the fuel cell module.

With the fuel cell module of the present disclosure, it is possible to smoothly perform inspection or maintenance on the maintenance components.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

One embodiment of a fuel cell module according to the present embodiment will be hereinafter described in detail with reference to the drawings.

Figure 1:
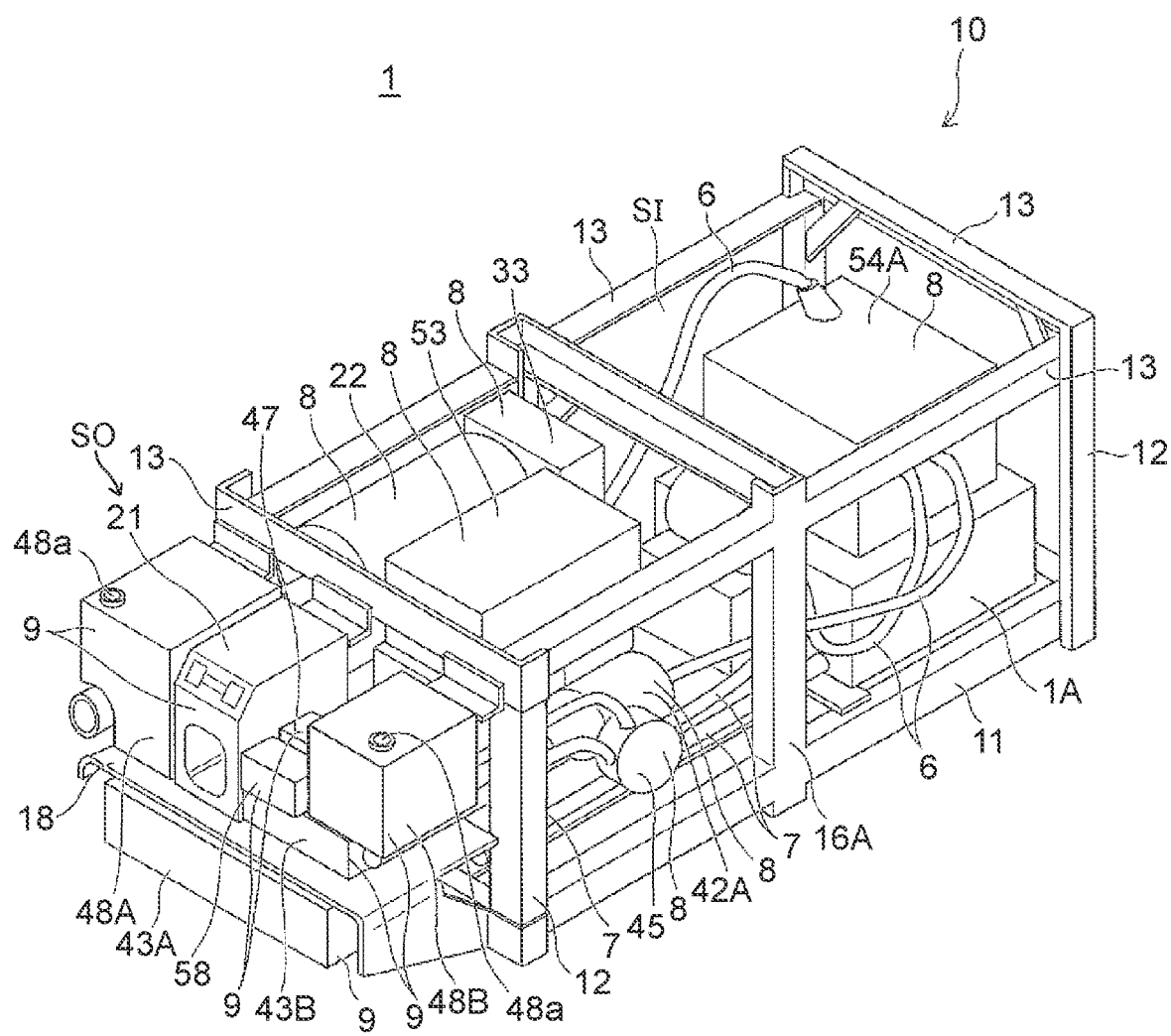
FIG. 1 is a schematic perspective view of a fuel cell module according to the present embodiment.
Figure 2:
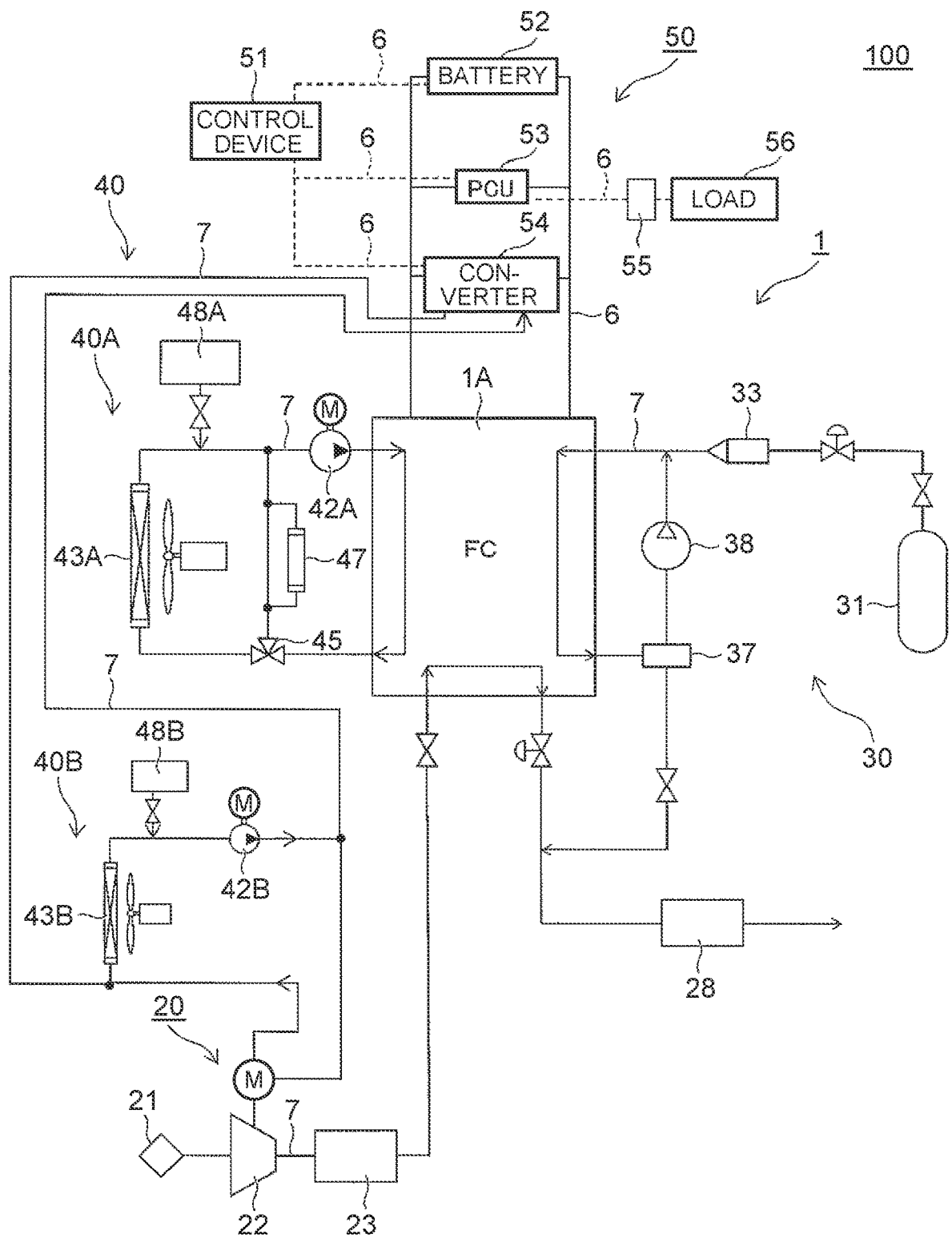
FIG. 2 is a schematic system diagram of a fuel cell system constituting one embodiment of the fuel cell module according to the present embodiment.

As illustrated in FIG. 1, a fuel cell module 1 according to the present embodiment includes a fuel cell stack 1A, a plurality of accessories (described later) configured to drive the fuel cell stack 1A, and a frame 10 to which the fuel cell stack 1A and the accessories are fixed. The frame 10 will be described later. As illustrated in FIG. 2, a fuel cell system 100 is constituted by the fuel cell module 1, instruments such as maintenance components, and other devices such as a hydrogen tank.

A fuel cell of the fuel cell stack 1A includes an electrolyte membrane having ionic permeability, and a membrane electrode assembly (MEA) constituted by an anode-side catalytic layer (an anode electrode) and a cathode-side catalytic layer (a cathode electrode) between which the electrolyte membrane is sandwiched. On either side of the MEA, a gas diffusion layer (GDL) configured to supply hydrogen gas as fuel gas or air as oxidant gas and to collect electric power generated by an electrochemical reaction is formed. The membrane electrode assembly on either side of which the GDL is placed is referred to as an MEGA, and the MEGA is sandwiched between separators provided in a pair. Here, the MEGA is a power generation portion of the fuel cell, and when no gas diffusion layer is provided, the MEA serves as the power generation portion of the fuel cell.

The fuel cell stack 1A is connected to the accessories configured to drive the fuel cell stack 1A, and as illustrated in FIG. 2, the accessories constitute an air supply system 20, a hydrogen gas supply system 30, a cooling system 40, and a control system 50.

The air supply system 20 is configured to supply the air to the cathode electrode of the fuel cell constituting the fuel cell stack 1A and to discharge, from the fuel cell stack 1A, offgas subjected to an electrochemical reaction in the fuel cell. The air supply system 20 includes an air cleaner 21, a compressor 22, an inter cooler 23, and so on provided in this order from the upstream side from the fuel cell stack 1A, and the air supply system 20 also includes a muffler 28 and so on provided on the downstream side from the fuel cell stack 1A.

The air cleaner 21 removes contaminations such as dust in the air taken in from atmosphere and is placed on the upstream side from the compressor 22 configure to supply the air to the fuel cell stack 1A. The compressor 22 compresses the air introduced via the air cleaner 21 and pumps the compressed air to the inter cooler 23. When the air pumped from the compressor 22 and introduced into the inter cooler 23 is passed through the inter cooler 23, the inter cooler 23 cools the air by heat exchange with coolant and supplies the air to the fuel cell stack 1A (the cathode electrode thereof), for example. In the fuel cell module 1 of the present embodiment, the compressor 22 and the inter cooler 23 are fixed to the frame 10 as the accessories of the fuel cell stack 1A.

The hydrogen gas supply system 30 is configured to supply hydrogen gas to the anode electrode of the fuel cell constituting the fuel cell stack 1A and to discharge, from the fuel cell stack 1A, offgas subjected to an electrochemical reaction in the fuel cell. The hydrogen gas supply system 30 includes a hydrogen gas source 31 and a hydrogen gas supply device 33 in this order from the upstream side from the fuel cell stack 1A, and the hydrogen gas supply system 30 also includes a gas-liquid separator 37 on the downstream side from the fuel cell stack 1A. The hydrogen gas supply system 30 includes a hydrogen gas pump 38 configured to circulate the hydrogen gas passing through the gas-liquid separator 37 to the upstream side.

The hydrogen gas supply device 33 includes an injector or the like configured to supply hydrogen gas to the fuel cell stack 1A. The gas-liquid separator 37 separates generated water included in the offgas. The hydrogen gas from which the generated water is separated is sent to the hydrogen gas pump 38, and the generated water is sent to the muffler 28. The hydrogen gas pump 38 pumps the hydrogen gas thus separated in the gas-liquid separator 37 and circulates the hydrogen gas to a fuel gas supply passage. In the fuel cell module 1 of the present embodiment, as the accessories of the fuel cell stack 1A, the hydrogen gas pump 38 and so on are provided in the frame 10.

The cooling system 40 is constituted by a first cooling system 40A configured to cool the fuel cell stack 1A, a high-voltage instrument 54A (see FIG. 1) in which a converter 54 (described later) and so on are put together, and a second cooling system 40B configured to cool a motor or the like of the compressor 22.

The first cooling system 40A is a circulatory system. The first cooling system 40A is provided with a first pump 42A, a first heat exchanger 43A, a three-way valve (rotary valve) 45, an ion exchanger 47, and a first tank 48A. The first pump 42A pumps a first coolant (coolant) cooled by the first heat exchanger 43A to the fuel cell stack 1A. The first heat exchanger 43A cools the first coolant discharged from the fuel cell stack 1A. The ion exchanger 47 has a function to remove ions from the coolant that cools the fuel cell stack 1A, and the ion exchanger 47 is provided in a bypass passage. The three-way valve 45 introduces the coolant discharged from the fuel cell stack 1A into the first heat exchanger 43A or the ion exchanger 47 in a divided manner. In the first tank 48A, a coolant as a refill for the first cooling system 40A is stored, and when the first cooling system 40A does not have a sufficient coolant, the coolant as a refill is supplied to the first cooling system 40A. In the present embodiment, as the accessories of the fuel cell stack 1A, the first pump 42A, the three-way valve 45, and so on are fixed to the frame 10.

The second cooling system 40B is provided with a second heat exchanger 43B, a second pump 42B, and a second tank 48B. The second pump 42B pumps a second coolant (coolant) cooled by the second heat exchanger 43B to the converter 54 and so on. The second heat exchanger 43B cools the coolant discharged from some of the accessories such as the converter 54. In the second tank 48B, a coolant as a refill for the second cooling system 40B is stored, and when the second cooling system 40B does not have a sufficient coolant, the coolant as a refill is supplied to the second cooling system 40B. In the present embodiment, as the accessories of the fuel cell stack 1A, the second pump 42B and so on are fixed to the frame 10.

Various instruments (accessories and so on) in the air supply system 20, the hydrogen gas supply system 30, and the cooling system 40 are connected to each other via pipes 7 having flexibility. The flow rates, the pressures, and so on of fluid flowing through these members are controlled via valves. Note that, in FIGS. 1, 4, among a plurality of pipes, some pipes 7 are illustrated.

The control system 50 is configured to control driving and so on of the fuel cell stack 1A. The control system 50 is provided with a control device 51, a battery 52, a PCU 53, a converter 54, a junction box (relay box) 55, and a load 56. The control device 51 controls the valves and the power control unit (PCU) 53 (described later). Electric power generated in the fuel cell stack 1A is stored in the battery 52. The PCU 53 supplies electric power to the load 56 via the junction box 55 in response to the control by the control device 51. The converter 54 is included in the high-voltage instrument 54A (see FIG. 1) and boosts an output voltage from the fuel cell stack 1A and supplies it to the PCU 53. These accessories are electrically connected to each other via cables 6. However, in FIGS. 1, 4, among a plurality of cables, some cables 6 are illustrated.

In addition to these members, a relay box 58 as illustrated in FIG. 1 and so on is provided, though the relay box 58 is not illustrated in the system diagram of FIG. 2. The relay box 58 is electrically connected to some accessories from among a plurality of accessories such as the fuel cell stack 1A, the high-voltage instrument 54A including the converter 54, or the like. For example, the relay box 58 is a box in which a relay (not illustrated) is accommodated, the relay being configured to selectively perform supply of electric power from the battery 52 to several accessories or supply of electric power from the fuel cell stack 1A to the battery 52.

Figure 4:
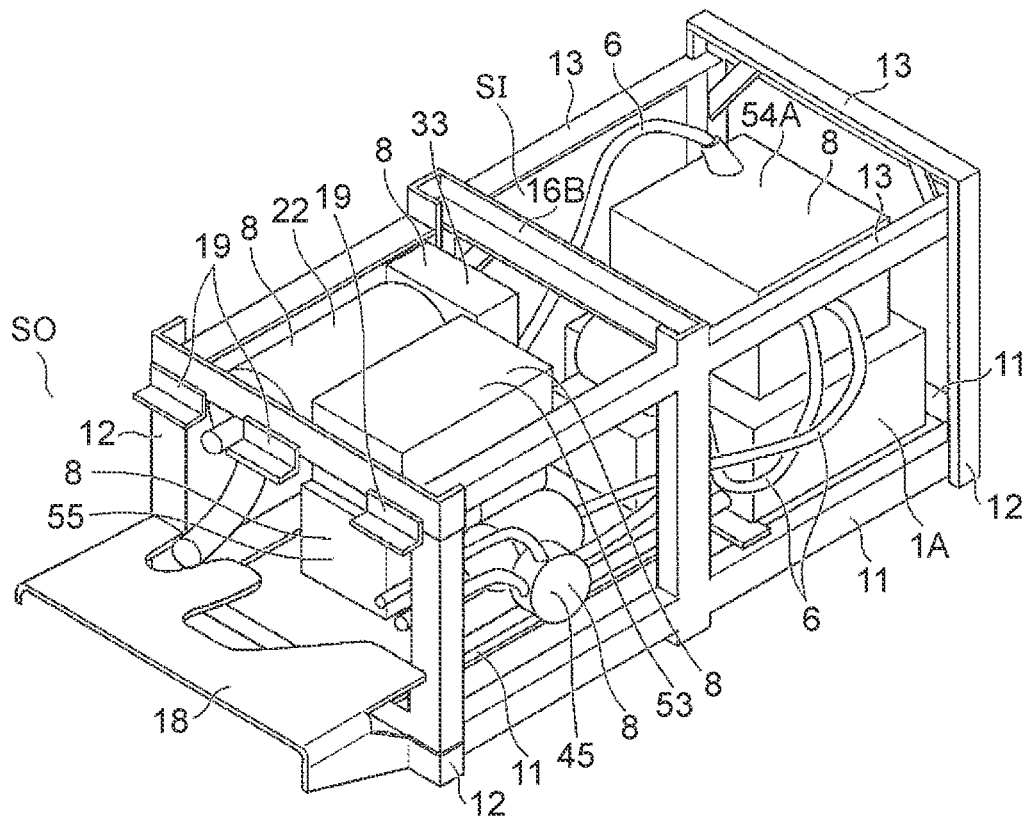
FIG. 4 is a perspective view of a state where a fuel cell stack and accessories are attached to the fuel cell module illustrated in FIG. 1.

Here, in the present embodiment, as illustrated in FIGS. 1, 4, the fuel cell stack 1A and the accessories are fixed to the frame 10. The accessories fixed to the frame 10 include the compressor 22, the inter cooler 23, the hydrogen gas supply device 33, the hydrogen gas pump 38, the first pump 42A, the three-way valve 45, the second pump 42B, the PCU 53, the high-voltage instrument 54A, the junction box 55, and so on. These accessories are fixed to the frame 10 in a state where they are accommodated in an internal space SI surrounded by beams (lower beams 11, upper beams 13) and pillars 12 of the frame 10 (described later), and a reference sign 8 is assigned to these accessories in FIGS. 1, 4.

Figure 5:
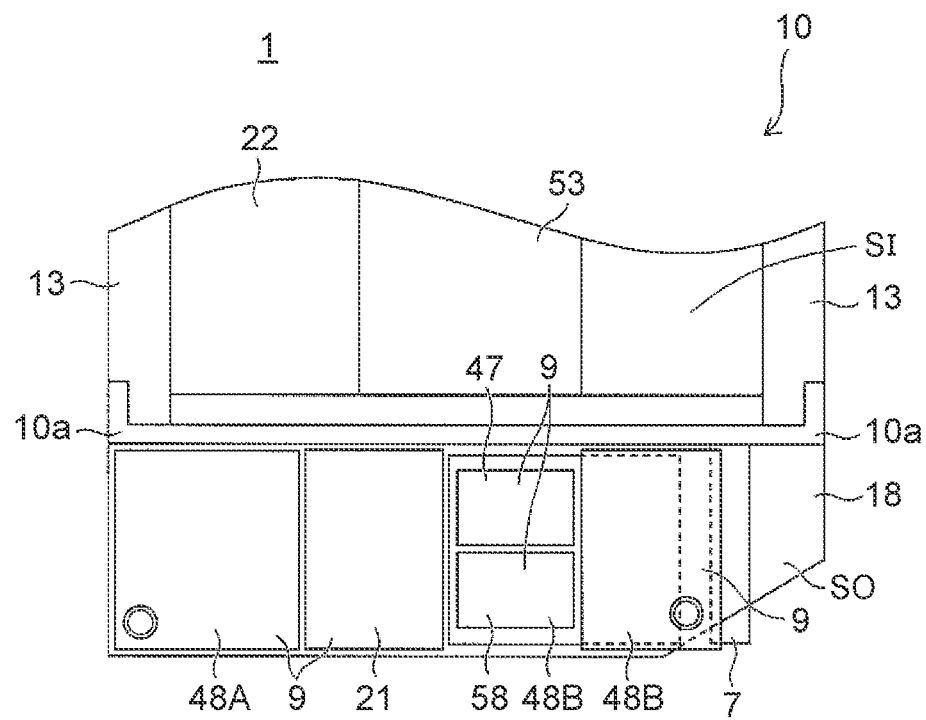
FIG. 5 is a partial plan view near maintenance components of the fuel cell module in the present embodiment.

Further, the air cleaner 21, the first and second heat exchangers 43A, 43B, the ion exchanger 47, the first and second tanks 48A, 48B, and the relay box 58 are maintenance components that require inspection or maintenance, and a reference sign 9 is assigned to these components in FIGS. 1, 4, 5. Note that the maintenance components 9 are not limited to these components, and some of the maintenance components may include accessories configured to drive the fuel cell stack 1A. Further, the accessories or the components placed in the frame 10 may also include an accessory or a component other than those described above.

Figure 3:
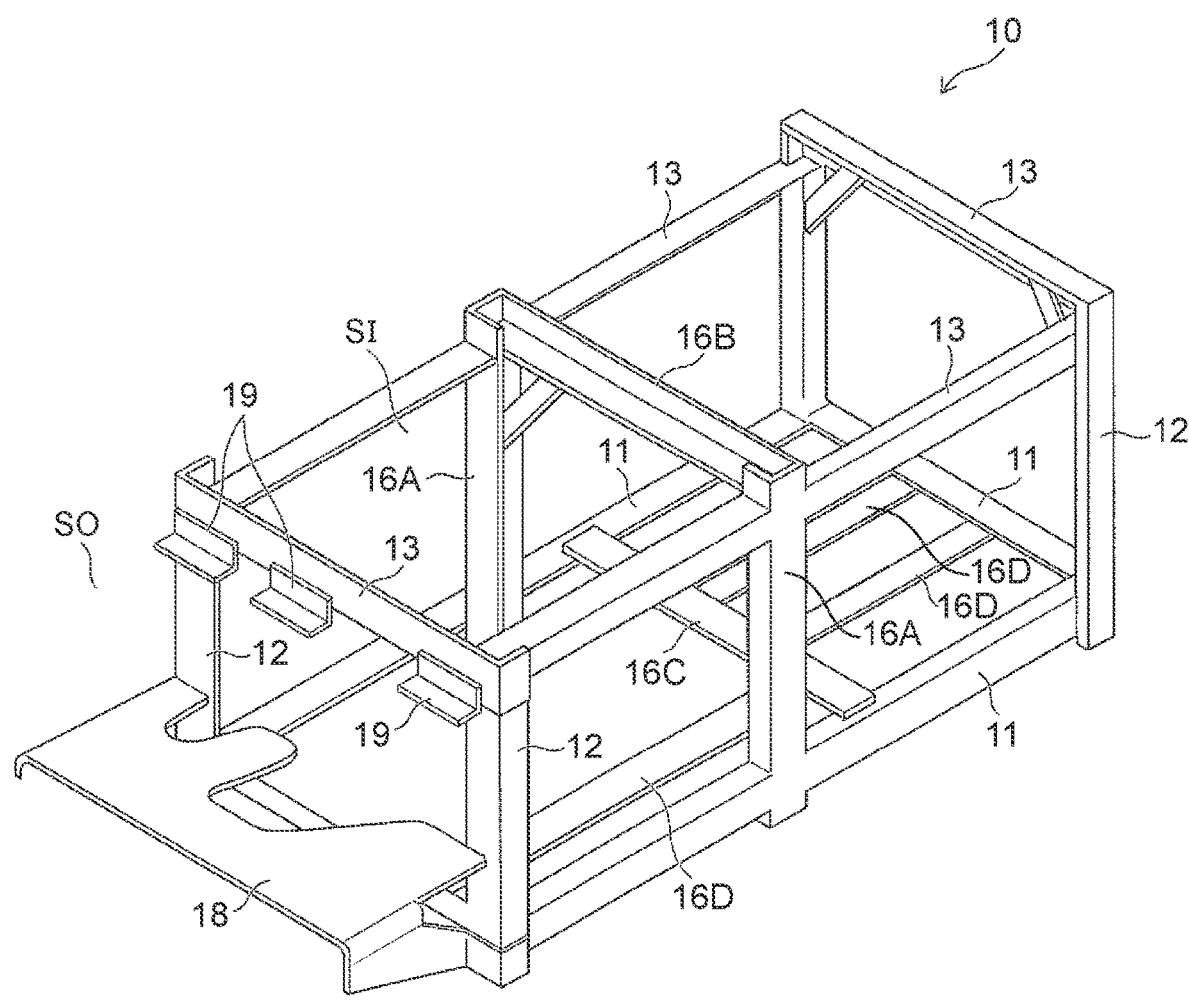
FIG. 3 is a perspective view of a frame of the fuel cell module illustrated in FIG. 1.

In the present embodiment, the fuel cell stack 1A, the accessories 8, and the maintenance components 9 are supported by the frame 10. In FIG. 3, the frame 10 is a three-dimensional structure having the internal space SI surrounded by the beams 11, 13 and the pillars 12. The frame 10 is basically formed by joining a metal groove-shape steel material, an angle brace, a pipe material, or the like.

More specifically, as illustrated in FIG. 3, the frame 10 includes the lower beams 11 connected to each other in a rectangular shape and extending horizontally, the pillars 12 extending vertically from connecting portions between the lower beams 11, and the upper beams 13 via which upper parts of the pillars 12 are connected to each other, the upper beams 13 extending horizontally. Hereby, the internal space SI is formed in the frame 10. In the present embodiment, the internal space SI is a space surrounded by the lower beams 11 connected to each other, the pillars 12 provided in a standing manner from the connecting portions between the lower beams 11, and the upper beams 13 via which the pillars 12 are connected to each other.

Further, the frame 10 includes connection pillars 16A via which the centers of the lower beams 11 extending along the longitudinal direction of the frame 10 are connected to the upper beams 13 vertically facing the lower beams 11, and connection beams 16B via which the upper beams 13 facing each other are connected to each other. Further, a support plate 16C is connected to the lower beams 11 as long sides facing each other, and support plates 16D are provided to connect the support plate 16C to the lower beams 11 as short sides.

A shelf member 18 is attached to the frame 10 in an external space SO formed on one side from the frame 10 among external spaces formed outside the internal space. In the present embodiment, the shelf member 18 is a plate-shaped member, and the shelf member 18 is fixed to the pillars 12 by welding or the like. Further, brackets 19 via which some of the maintenance components 9 are fixed to the frame 10 are attached to the upper beam 13 provided above the shelf member 18.

As illustrated in FIG. 4, the fuel cell stack 1A and the accessories 8 are fixed to the frame 10 in a state where they are accommodated in the internal space SI of the frame 10. More specifically, the accessories 8 fixed to the frame 10 inside the internal space SI are the compressor 22, the inter cooler 23, the hydrogen gas supply device 33, the hydrogen gas pump 38, the first pump 42A, the three-way valve 45, the second pump 42B, the PCU 53, the high-voltage instrument 54A, the junction box 55, and so on.

Further, as illustrated in FIG. 5, in a plan view of the fuel cell module 1, the outer shape of the frame 10 formed by the lower beams 11, the pillars, and the upper beams 13 is a rectangular frame shape. In this plan view, the maintenance components 9 are fixed to the frame 10 in a state where they are placed in the external space SO formed on the one side from the frame 10 outside the internal space SI of the frame 10. More specifically, the maintenance components 9 are placed in the external space SO adjacent to the upper beam 13 (the lower beam 11) on the one side out of the upper beams 13 (the lower beams 11) facing each other in the plan view. The maintenance components are arranged in the up-down direction across the shelf member 18.

More specifically, in the present embodiment, the maintenance components 9 include the air cleaner 21, the first and second heat exchangers 43A, 43B, the ion exchanger 47, the first and second tanks 48A, 48B, and the relay box 58.

The air cleaner 21, the second heat exchanger 43B, the ion exchanger 47, the first and second tanks 48A, 48B, and the relay box 58 are placed above the shelf member 18, and the first heat exchanger 43A is placed below the shelf member 18. By placing the maintenance components 9 above and below the shelf member 18, the maintenance components 9 can be put together efficiently in a small space, thereby making it possible to increase stability in the posture of the fuel cell module 1.

In the present embodiment, the air cleaner 21 and the first and second tanks 48A, 48B are fixed to the frame 10 via the brackets 19. The other maintenance components 9 may be directly fixed to the shelf member 18 and, for example, may be fixed to the shelf member 18 or the frame 10 via a bracket or their adjacent maintenance component.

The maintenance components 9 described herein are components on which inspection or maintenance is performed regularly. In the first and second heat exchangers 43A, 43B, corrosion in a radiator or the like due to the first or second coolant, adhesion of foreign matter, and the like may be caused due to continuous use, and therefore, the first and second heat exchangers 43A, 43B are subjected to inspection or cleaning or replaced as needed.

When the first and second coolants circulating through the first and second heat exchangers 43A, 43B become insufficient, the first and second coolants stored in the first and second tanks 48A, 48B are supplied to their circulation passages. Accordingly, in order to secure storage amounts of the first and second coolants in the first and second tanks 48A, 48B, the first and second tanks 48A, 48B are inspected regularly, and the first and second tanks 48A, 48B are refilled with the first and second coolants, respectively.

An ion exchange membrane (not illustrated) is placed in the ion exchanger 47. In a case where metal ions or the like are included in the first coolant discharged from the fuel cell stack 1A, ions such the metal ions are captured by the ion exchange membrane. Accordingly, ion exchange performance of the ion exchanger 47 decreases in accordance with a captured amount of the ions. In view of this, the ion exchanger 47 is repaired or replaced regularly.

A filter (not illustrated), for example, is placed in the air cleaner 21, and the filter captures contaminations contained in the air. Accordingly, when the air cleaner 21 is kept used, the filter clogs up due to contaminations, and therefore, the filter of the air cleaner 21 is cleaned up or replaced regularly.

The relay box 58 is a relay box in which a relay electrically connected to the fuel cell stack 1A or some of the accessories 8 is accommodated, and the relay box 58 is subjected to inspection more frequently than the other maintenance components 9.

As such, in comparison with the accessories 8 accommodated in the internal space SI of the frame 10, the maintenance components 9 are subjected to inspection or maintenance frequently. Accordingly, by placing the maintenance components 9 in the external space formed on the one side from the frame, the maintenance components 9 can be inspected smoothly or working efficiency of the maintenance can be raised.

Further, in the present embodiment, as illustrated in FIG. 5, in a plan view of the fuel cell module 1, the first tank 48A and the second tank 48B are placed closer to corners 10a of the frame 10 (around the corners 10a), respectively. In the present embodiment, the first tank 48A and the second tank 48B are placed closer to both corners 10a of the frame 10, respectively. However, either one of the tanks that is more frequently refilled with the first or second coolant may be placed closer to one of the corners 10a. With such an arrangement, it is possible to easily check the storage amount of the first or second coolant. Particularly, when a light transmissive material such as a transparent material is used for the first or second tank 48A, 48B, it is possible to more smoothly inspect the storage amount.

In the present embodiment, the first and second tanks 48A, 48B are placed above the shelf member 18, and covers 48a of the first and second tanks 48A, 48B are provided in respective tank upper parts. Accordingly, the cover 48a can be easily attached and detached, so that the first or second coolant can be easily filled from a liquid refilling port of a tank body by detaching the cover 48a.

Further, when the first tank 48A and the first heat exchanger 43A are regarded as a first set, and the second tank 48B and the second heat exchanger 43B are regarded as a second set, the first tank 48A constituting the first set is placed above the first heat exchanger 43A. The second tank 48B constituting the second set is placed above the second heat exchanger 43B. More specifically, the first tank 48A is placed above the shelf member 18, and the first heat exchanger 43A is placed below the shelf member 18. Further, the second tank 48B and the second heat exchanger 43B are arranged in the up-down direction above the shelf member 18.

Hereby, the maintenance components 9 are arranged such that the first tank 48A is placed above the first heat exchanger 43A, so that the air accumulated in the first heat exchanger 43A and the cooling passage can be easily removed from the liquid refilling port of the first tank 48A. Similarly, since the second tank 48B is placed above the second heat exchanger 43B, the air accumulated in the second heat exchanger 43B and the cooling passage can be easily removed from the liquid refilling port of the second tank 48B.

As illustrated in FIG. 5, the ion exchanger 47 and the relay box 58 are provided in the external space SO such that they are arranged side by side in a direction distanced from the internal space SI, and the relay box 58 is placed at a position more distanced from the internal space SI than the ion exchanger 47. The relay box 58 that is more frequently inspected than the ion exchanger 47 is placed at a position more distanced from the internal space SI of the frame 10 than the ion exchanger 47. Accordingly, it is possible to more smoothly perform inspection on the relay box 58.

Thus, with the fuel cell module 1, the maintenance components 9 that require inspection or maintenance are fixed to the frame 10 in a state where they are placed in the external space SO formed on the one side from the frame among the external spaces SO formed outside the internal space SI of the frame 10. Accordingly, when a space that enables operations is provided near the external space SO formed on the one side from the frame 10 at the time when the fuel cell module 1 is fixed to a vehicle or the like, it is possible to smoothly perform inspection or maintenance on the maintenance components 9.

One embodiment of the present disclosure has been described above in detail, but the present disclosure is not limited to the above embodiment, and various design modifications can be made without departing from the spirit of the disclosure described in Claims.

What is claimed is:

1. A fuel cell module comprising:
a fuel cell stack;
a plurality of accessories configured to drive the fuel cell stack;
a plurality of maintenance components connected to the fuel cell stack or any of the accessories and to be subjected to inspection or maintenance; and
a frame configured to support the fuel cell stack, the accessories, and the maintenance components, wherein:
the frame has a three-dimensional structure having an internal space surrounded by beams and pillars;
the fuel cell stack and the accessories are fixed to the frame in a state where the fuel cell stack and the accessories are accommodated in the internal space; and
in a plan view of the fuel cell module, the maintenance components are fixed to the frame in a state where the maintenance components are placed in an external space formed on one side from the frame among external spaces formed outside the internal space, wherein the maintenance components include at least a first heat exchanger configured to cool a first coolant discharged from the fuel cell stack.

2. The fuel cell module according to claim 1, wherein the maintenance components further include at least one or more of the following:
a first tank in which a refill for the first coolant is stored;
a second heat exchanger configured to cool a second coolant discharged from some of the accessories;
a second tank in which a refill for the second coolant is stored;
an ion exchanger configured to capture ions included in the first coolant circulating between the first heat exchanger and the fuel cell stack;
an air cleaner placed on an upstream side from a compressor configured to supply air to the fuel cell stack, from among the accessories; and
a relay box electrically connected to the fuel cell stack or some of the accessories.

3. The fuel cell module according to claim 2, wherein:
the maintenance components further include the first tank or the second tank;
in a plan view of the fuel cell module, the frame has a rectangular outer shape; and
the first tank or the second tank is placed closer to a corner of the frame.

4. The fuel cell module according to claim 2, wherein:
the maintenance components further include at least either one of a first and a second set, the first set being constituted by the first tank and the first heat exchanger, the second set being constituted by the second tank and the second heat exchanger; and
the first tank is placed above the first heat exchanger, or the second tank is placed above the second heat exchanger.

5. The fuel cell module according to claim 2, wherein:
the maintenance components further include the ion exchanger and the relay box;
the ion exchanger and the relay box are provided in the external space such that the ion exchanger and the relay box are arranged side by side in a direction distanced from the internal space; and
the relay box is placed at a position more distanced from the internal space than the ion exchanger.

6. The fuel cell module according to claim 1, wherein:
a shelf member is attached to the frame in the external space formed on the one side; and
the maintenance components are arranged in an up-down direction across the shelf member.

* * * * *